E. J. RATEKIN.
ADJUSTABLE CLEVIS FOR AGRICULTURAL IMPLEMENTS.
APPLICATION FILED APR. 24, 1916.
1,222,580.
Patented Apr. 10, 1917.
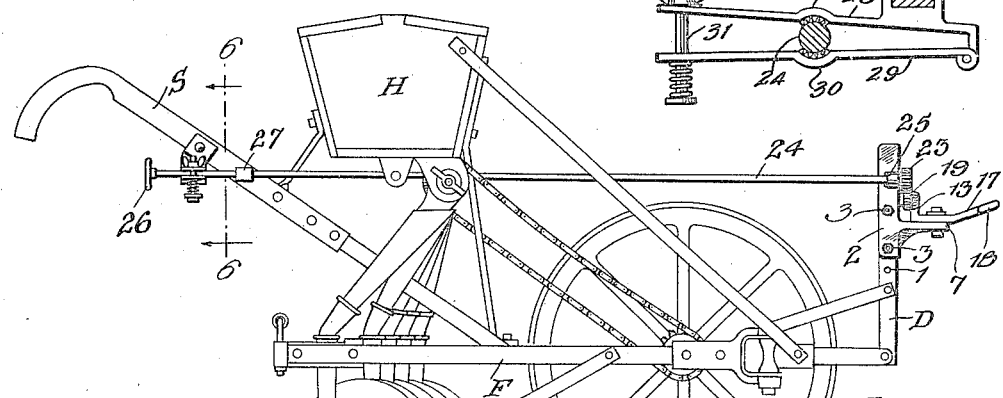
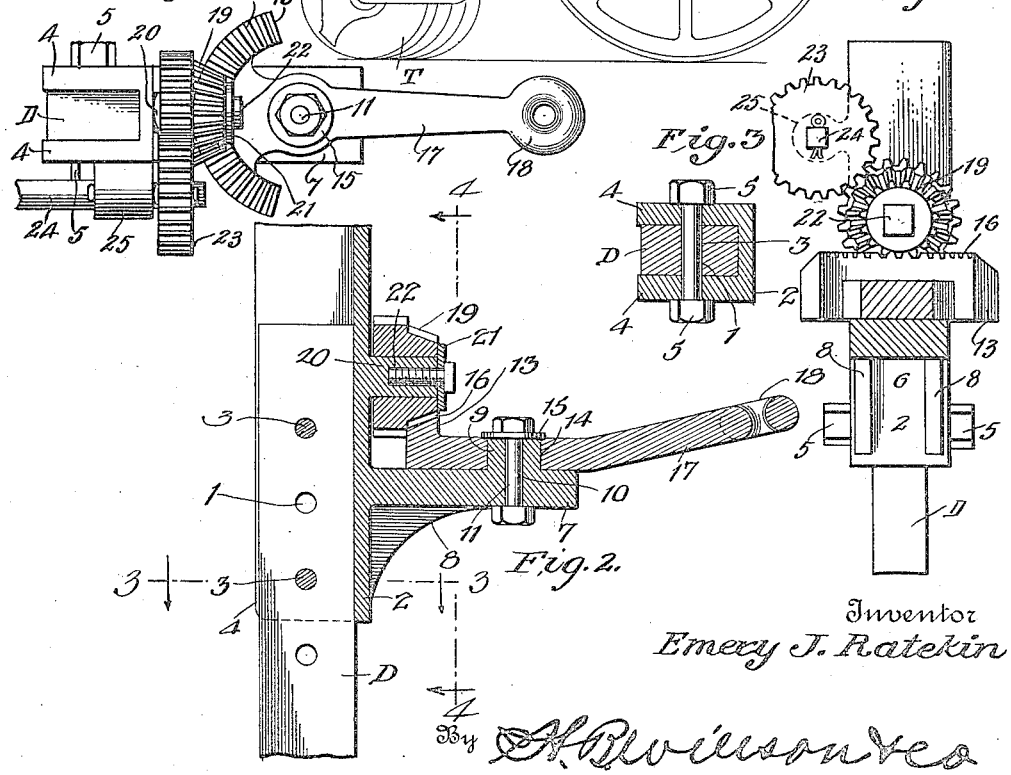
Inventor
Emery J. Ratekin
Attorneys

UNITED STATES PATENT OFFICE.

EMERY J. RATEKIN, OF RUSHVILLE, INDIANA, ASSIGNOR TO ALBERT G. SHAUCK AND EARL D. McFALL, OF ARLINGTON, INDIANA.

ADJUSTABLE CLEVIS FOR AGRICULTURAL IMPLEMENTS.

1,222,580. Specification of Letters Patent. Patented Apr. 10, 1917.

Application filed April 24, 1916. Serial No. 93,237.

*To all whom it may concern:*

Be it known that I, EMERY J. RATEKIN, a citizen of the United States, residing at Rushville, in the county of Rush and State of Indiana, have invented certain new and useful Improvements in Adjustable Clevises for Agricultural Implements; and I do declare the following to be a full, clear, and exact description of the invention, such as will enable others skilled in the art to which it appertains to make and use the same.

This invention relates to improvements in agricultural implements, and more particularly to adjustable means for shifting the draft clevis so that the direction of movement of the implements will be changed.

Many forms of agricultural machines, but particularly grain drills, are inclined to run to one side or the other of the row, when the ground which is being worked is not perfectly level, thus making it very hard for the driver to steer the device. My invention is designed to overcome this difficulty by shifting the draft clevis either to the right or to left whichever the case may be so that the machine to which it is applied will run in a straight line.

The invention comprises certain novel features of construction, combination and arrangement of parts which will hereinafter be more particularly described and claimed.

In the accompanying drawings:

Figure 1 represents a side elevation of a grain drill showing my improved device applied thereto;

Fig. 2 is a central vertical section through my invention;

Fig. 3 is a detail horizontal section taken on the line 3—3 of Fig. 2;

Fig. 4 is a vertical transverse section taken on the line 4—4 of Fig. 2;

Fig. 5 is a plan view of the invention; and

Fig. 6 is a section taken on the line 6—6 of Fig. 1 showing a form of clamp which may be used in connection with the other parts of the invention.

In the present instance I have shown the invention applied to an ordinary one-horse grain drill which comprises a frame F which is supported at its front end by the wheel W and at its rear end by the earth-working tools T, the grain hopper H being above these tools. The machine is drawn by a horse or other animal which is hitched to the draft standard D, and is guided by the driver who walks in the rear thereof by means of the steering handles S.

The draft standard D is ordinarily in the form of an upright rectangular metallic or wooden bar having a plurality of vertically spaced openings 1 by which the draft clevis may be adjustably connected thereto. In applying my device, however, the ordinary draft clevis is removed and a channel-shaped attaching plate 2 secured thereto by means of bolts 3 which extend through apertures in the flanges 4 of the channel-plate and through the openings 1 in the standard D, nuts 5 being threaded on the ends of the bolts 3 to removably yet securely hold the attachment to the implement.

From the body portion 6 of the channel plate 2 is extended an arm 7, said arm projecting outwardly at right angles from the portion 6 at a point intermediate the ends thereto. This arm 7 is preferably although not necessarily formed integral with the channel plate 2 and is provided on its lower face with reinforcing wings 8 which are also connected to said plate. A stud 9 is formed on the top of said substantially horizontal arm 7 adjacent its middle portion and is provided with an aperture 10, said aperture being also extended through said arm 7 and receives a bolt 11. An arcuate plate 13 is disposed on the arm 7, said stud 9 being received in an opening 14 in said plate and a washer 15 is placed on said stud and overlies the portions of the plate surrounding the opening 14 so that when the bolt 11 with its nut 12 is applied, said arcuate plate will be pivotally secured to the outwardly extending arm 7. The plate 13 has rack teeth 16 on its upper surface adjacent its inner edge, while an arm 17 is formed integral with the outer edge of the plate and extends outwardly beyond the end of the arm 7, the free end portion of this arm 17 being bent upward slightly as shown and provided with an eye 18, by which the usual hook carried by the draft tree, (not shown), is attached.

The rack teeth 16 are adapted to mesh with the teeth of a pinion 19 which is rotatably mounted on a stud 20 projecting outwardly from the body portion 6 of the channel plate 2 parallel to the arm 7, and is held thereon by means of a washer 21 which in turn is secured in place by the head of a bolt 22. This bolt may be secured to the stud in any preferred manner such as that illustrated in the drawings and shown most clearly in Fig. 2. In this case, a socket in the stud is threaded for the reception of the bolt 22.

It will be seen that since the pinion 19 meshes with the rack teeth 16, the arm 17 will be swung either to the right or left upon movement of said pinion. In order to accomplish this movement an additional pinion 23 is provided for engagement with the pinion 19, said pinion 23 being fixed to the end of an operating shaft 24 which is rotatably mounted in a suitable bearing 25 formed on one of the flanges 4 of the channel plate 2. This operating rod or shaft 24 extends rearwardly from the front end of the agricultural implement to a point adjacent the driver, where it is provided with a hand wheel 26. The rear end of the rod is preferably rotatably disposed in a suitable bearing 27 carried by one of the handles S.

It is necessary to provide some sort of clamp or stop by which the rotation of the operating shaft may be prevented, so that movement of the arm 17 may be limited. While any preferred means may be employed, that shown consists of a clamp having a stationary jaw 28 which is preferably fixed to one of the handles S and a movable jaw 29 pivotally connected to the other. The intermediate portions of these jaws are bent outwardly as shown at 30 to form seats for the reception of the operating shaft, said seats preferably being serrated to more firmly grip the rod and the free end of the movable jaw 29 is connected to the other by a clamp screw 31. This screw 31 is provided with an expansion helical spring by which the movable jaw is normally forced toward the other.

After the attachment has been secured to the drill or other implement upon which it is desired to use the same, it will be seen that the arm 17 may be directed either to the right or left by rotation of the hand wheel on the end of the operating shaft 24, and when moved to this position, may be held by the action of the clamp on said shaft. This movement of the arm will slightly change the point of application of the force being applied to the implement by the draft animal which is attached to said arm 17 through the draft tree, thus causing the agricultural machine to change its line of travel slightly. With a device such as above described, it will be seen that the machine upon which it is used, may be kept in the center of the space between the rows irrespective of whether the rows are straight or not. This invention will be found to be of great advantage when cultivating between rows of growing corn, particularly those which are planted on hillsides where the rows are very irregular.

It is obvious that various changes may be made in the form, proportion, and the minor details of construction of this invention without departing from or sacrificing any of the principles thereof as set forth in the appended claim.

I claim as my invention:

A device of the class described comprising a one-piece attaching member in the form of a vertically disposed channel iron whose side flanges are adapted to receive therebetween a vertical standard of an implement and are formed with openings to receive attaching bolts, a rigid one-piece horizontal arm formed integrally with and extending laterally from the body of said attaching member at the lower end thereof and having an integral vertically disposed stud on its upper side and at its outer end, a horizontal stud formed integrally with said body of the attaching member and extending therefrom above the aforesaid arm, a gear segment mounted for horizontal oscillation on the vertically disposed stud and having means for the attachment of a draft tree, a pinion rotatably mounted on said horizontal stud and meshing with said segment, a bearing formed integrally with one side flange of the attaching member, and an operating shaft rotatably mounted in said bearing and having a gear meshing with the aforesaid pinion.

In testimony whereof I have hereunto set my hand in presence of two subscribing witnesses.

EMERY J. RATEKIN.

Witnesses:
J. E. GAUTNER,
JOHN RUTLIDGE.

Copies of this patent may be obtained for five cents each, by addressing the "Commissioner of Patents, Washington, D. C."